(12) United States Patent
Wang et al.

(10) Patent No.: US 11,469,642 B2
(45) Date of Patent: Oct. 11, 2022

(54) THREE-PHASE DRAINAGE MOTOR FOR WASHING MACHINE

(71) Applicant: WUXI HAOLI PUMPS INDUSTRIAL CO., LTD, Wuxi (CN)

(72) Inventors: Xiachun Wang, Zhejiang (CN); Ben Wang, Zhejiang (CN)

(*) Notice: Subject to any disclaimer, the term of this patent is extended or adjusted under 35 U.S.C. 154(b) by 97 days.

(21) Appl. No.: 17/052,114

(22) PCT Filed: Oct. 11, 2019

(86) PCT No.: PCT/CN2019/110599
§ 371 (c)(1),
(2) Date: Oct. 30, 2020

(87) PCT Pub. No.: WO2021/056612
PCT Pub. Date: Apr. 1, 2021

(65) Prior Publication Data
US 2021/0249928 A1    Aug. 12, 2021

(30) Foreign Application Priority Data
Sep. 26, 2019   (CN) .......................... 201910917431.7

(51) Int. Cl.
| | |
|---|---|
| *H02K 5/10* | (2006.01) |
| *D06F 39/08* | (2006.01) |
| *H02K 1/14* | (2006.01) |
| *H02K 3/52* | (2006.01) |
| *H02K 5/167* | (2006.01) |

(Continued)

(52) U.S. Cl.
CPC .............. *H02K 5/10* (2013.01); *D06F 39/085* (2013.01); *H02K 1/146* (2013.01); *H02K 3/522* (2013.01); *H02K 5/1675* (2013.01); *H02K 7/085* (2013.01); *H02K 21/16* (2013.01); *H02K 2203/12* (2013.01)

(58) Field of Classification Search
CPC ............ H02K 3/522; H02K 5/10; H02K 5/15; H02K 5/124; H02K 5/1672; H02K 2203/12
See application file for complete search history.

(56) References Cited

U.S. PATENT DOCUMENTS 8,803,374 B2 * 8/2014 Yoshida ............... H02K 5/1672
310/90
9,551,347 B2 * 1/2017 Kim ..................... F04D 13/0606

FOREIGN PATENT DOCUMENTS

| CN | 205489921 U | 8/2016 |
|---|---|---|
| CN | 208015491 U | 10/2018 |

(Continued)

*Primary Examiner* — Dang D Le
(74) *Attorney, Agent, or Firm* — W&K IP

(57) ABSTRACT

A three-phase drainage motor for a washing machine includes a stator, a rotor and an upper cover. The rotor is sealed inside the stator through the upper cover and includes an iron core, a coil bobbin, a three-phase coil and a plastic package portion. The iron core includes a hub, an inner ring and teeth radially connecting the hub to the inner ring, the coil bobbin covers the teeth, the three-phase coil is wound around the coil bobbin. The plastic package portion is wrapped around the coil bobbin, the three-phase coil and the iron core to form a spigot, a rotor cavity and a rotary shaft cavity. The spigot is located above the rotor cavity. The rotary shaft cavity is at a bottom of the rotor cavity, the plastic package portion includes a housing, a wall surface of the rotor cavity and a wall surface of the rotary shaft cavity.

8 Claims, 7 Drawing Sheets

(51) Int. Cl.
*H02K 7/08* (2006.01)
*H02K 21/16* (2006.01)

(56) References Cited

FOREIGN PATENT DOCUMENTS

| | | |
|---|---|---|
| CN | 208401647 U | 1/2019 |
| CN | 208835886 U | 5/2019 |
| CN | 110212677 A | 9/2019 |
| CN | 210297415 U | 4/2020 |
| JP | 2013059526 A | 4/2013 |

* cited by examiner

THREE-PHASE DRAINAGE MOTOR FOR WASHING MACHINE

FIELD

The present invention belongs to the technical field of washing machines, and particularly relates to a three-phase drainage motor for a washing machine.

BACKGROUND

At present, most of three-phase drainage motors for washing machines on the market adopt a non-plastic-package stator structure, that is, a rotor is put into a motor housing with a rotor cavity, and nine sections of arc surfaces of an inner ring of an iron core directly sleeve an outer wall of the motor housing, however, a wall thickness of the outer wall of the motor housing causes an air gap, between the rotor and the inner ring of the iron core, of the motor to be expanded, it is well known that the air gap of the motor is one important indicator to measure the motor efficiency, and therefore such a non-plastic-package stator structure results in low motor efficiency, and the exposed iron core is also prone to rust. Besides, a semi-plastic-package stator structure of the three-phase drainage motor is available on the market, that is, a coil bobbin, a coil, and a hub and teeth of an iron core are plastic-packaged by engineering plastic, but nine sections of arc surfaces of an inner ring of the iron core are exposed to air, thereby reducing gaps, that is, an air gap of the motor, between a rotor and the nine sections of arc surfaces of the inner ring of the iron core to the maximum extent, so as to improve the motor efficiency, however, the rust problem caused by the fact that the nine sections of arc surfaces of the inner ring of the iron core are not plastic-packaged is ignored, and thus a rust protrusion generated on the nine sections of arc surfaces is prone to rub against an outer circle of the rotor to generate noise.

SUMMARY

For the above-mentioned deficiencies in the prior art, the present invention provides a three-phase drainage motor for a washing machine, so as to solve the technical problems that in the prior art, an air gap of a motor is large, the motor efficiency is low and the noise is generated by rust of an inner ring of an iron core.

A specific technical solution of the three-phase drainage motor for the washing machine provided by the present invention is as follows:

the three-phase drainage motor for the washing machine includes a stator, a rotor and an upper cover, wherein the rotor is sealed inside the stator through the upper cover;

the stator includes an iron core, a coil bobbin, a three-phase coil and a plastic package portion, wherein the iron core includes a hub, an inner ring and teeth, the teeth radially connecting the hub to the inner ring, the inner ring being of a nine-section arc structure, the coil bobbin covers the teeth, the three-phase coil is wound around the coil bobbin, the plastic package portion is wrapped around the coil bobbin, the three-phase coil and the iron core to form a spigot, a rotor cavity and a rotary shaft cavity, the spigot is located above the rotor cavity, the rotary shaft cavity is at a bottom of the rotor cavity, the plastic package portion includes a housing, a wall surface of the rotor cavity and a wall surface of the rotary shaft cavity, and the housing, the wall surface of the rotor cavity and the wall surface of the rotary shaft cavity are molded through integral injection; and the rotor is provided with a three-pole-pair permanent magnet and mounted inside the rotor cavity, wherein a rotary shaft of the rotor is arranged in the upper cover in a penetration mode, and the upper cover is detachably connected to the stator.

In certain embodiments, a diameter of the rotor cavity is less than that of the spigot, the plastic package portion is made of a bulk molding compound (BMC), and a wall thickness of a part, between a side wall surface of the rotor cavity and nine sections of arc surfaces of the inner ring of the iron core, of the plastic package portion is less than 0.6 mm.

In certain embodiments, the upper cover includes a cover body and a seal ring, wherein an axial center of the cover body is provided with an axis hole, the cover body protrudes towards a stator direction to form a mounting cavity and a positioning ring, the mounting cavity, the positioning ring and the axis hole are coaxially arranged, a diameter of the positioning ring is greater than that of the mounting cavity, and the seal ring is in close fit with the rotor cavity; the seal ring includes an annular base plate, wherein the annular base plate axially protrudes to form a mounting portion, the mounting portion is formed into a barrel body and arranged coaxial with the seal ring, the mounting portion is arranged on the rotary shaft of the rotor in a sleeving mode through a bearing, an inner wall of the mounting portion is in close fit with the bearing, the mounting portion is arranged in the mounting cavity in a closely embedded mode, the annular base plate is further provided with a positioning groove, and the positioning ring matches the positioning groove.

In certain embodiments, a lower portion of the cover body is provided with a plurality of clamping grooves, wherein the clamping grooves are uniformly distributed on an outer circumferential surface of the cover body around an axis, an upper portion of the stator is provided with a plurality of clamping blocks, and the clamping blocks are slidably clamped into the clamping grooves.

In certain embodiments, the cover body protrudes in a direction away from the stator to form a cavity, wherein the cavity and the axis hole are coaxially arranged.

In certain embodiments, a plurality of reinforcing ribs are uniformly arranged between the mounting cavity and the positioning ring, wherein the reinforcing ribs are radially arranged along the upper cover;

the annular base plate is further provided with a platform, wherein a groove is formed between the platform and the mounting portion, an edge of the mounting cavity is clamped into the groove, and the platform matches the reinforcing ribs; and a periphery of the annular base plate is further provided with a retaining ring, wherein the positioning groove is formed between the retaining ring and the platform, the positioning ring is of a step structure, the positioning ring is in hermetic fit with the positioning groove and the retaining ring, an outer wall of the retaining ring protrudes to form two seal outer rings, and the seal outer rings are arranged spaced from each other.

In certain embodiments, an outer wall of the bearing is dented to form a seal groove, the inner wall of the mounting portion is provided with a seal inner ring in seal fit with the seal groove, a cross section of the seal groove is rectangular, a cross section of the seal inner ring is semicircular, an end portion of the mounting portion protrudes to form an annular seal lip, and the annular seal lip is in close fit with a hole wall of the axis hole.

In certain embodiments, the rotary shaft cavity is provided with an end sleeve in a closely embedded mode, wherein an oil storage cavity is formed in the end sleeve, a rotor rear shaft extends into the oil storage cavity and is movably arranged in the oil storage cavity, an inner hole of the end sleeve is arranged in contact with an external diameter of the rotor rear shaft, and an end surface of the rotor rear shaft and a bottom surface of the oil storage cavity are arranged in a spaced mode.

In certain embodiments, the end sleeve includes a support sleeve, a rubber sleeve and a casing, wherein the rubber sleeve is closely arranged on the support sleeve in a sleeving mode, the casing is closely arranged on the rubber sleeve in a sleeving mode, and the casing is arranged in the rotary shaft cavity;

an upper end of the support sleeve is provided with an annular support table, wherein a diameter of the annular support table is greater than that of the rotary shaft cavity, and the annular support table is arranged above the rotor cavity and closely attached to a bottom surface of the rotor cavity; a bottom end of the rubber sleeve radially extends to form a fixing ring, wherein an inner diameter of the fixing ring is less than that of the support sleeve; and an end opening of the casing is uniformly provided with a plurality of notches, wherein depths of the notches are less than a height of the rubber sleeve.

The present invention has the following beneficial effects that the inner ring of the iron ring of the three-phase drainage motor for the washing machine provided by the present invention is of the nine-section arc structure, the coil bobbin, the three-phase coil and the iron core are all covered by the plastic package portion, a plastic injection portion includes the wall surface of the rotor cavity, a wall surface of a round hole of the bottom of the rotor cavity and a wall surface of the spigot, and the wall surface of the rotor cavity, the wall surface of the rotary shaft cavity and the wall surface of the spigot are molded through integral injection, such that the wall surface of the rotor cavity reduces the air gap of the motor to improve the motor efficiency, and meanwhile, prevents the noise problem caused by rust of the nine sections of arc surfaces of the inner ring of the iron core.

DETAILED DESCRIPTION OF THE EMBODIMENTS

Figure 1:
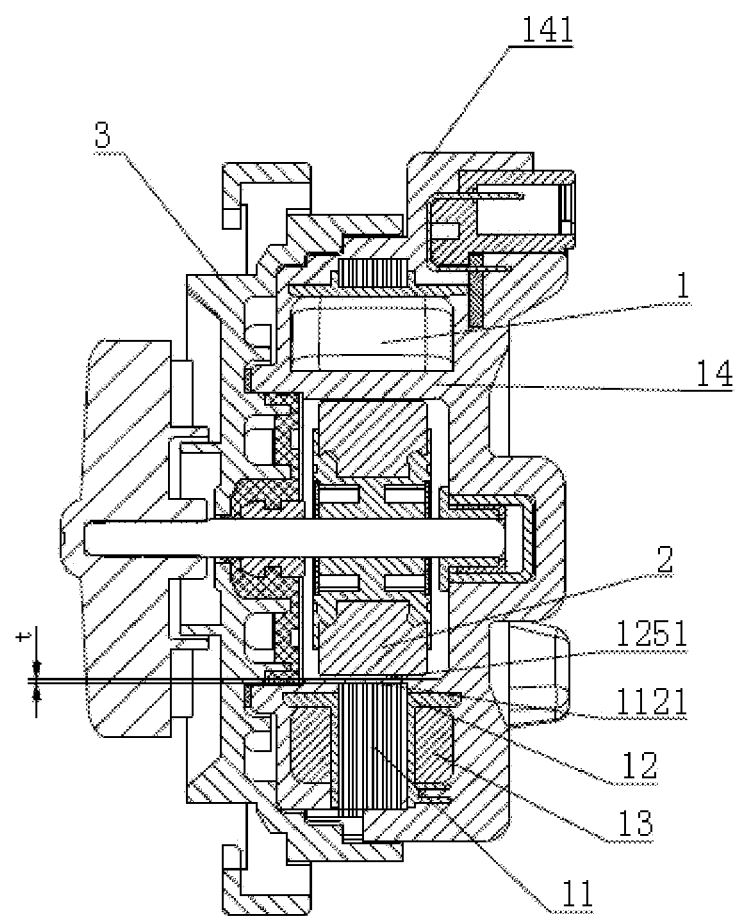
FIG. 1 is a planar schematic structural diagram of a three-phase drainage motor for a washing machine of the present invention.
Figure 2:
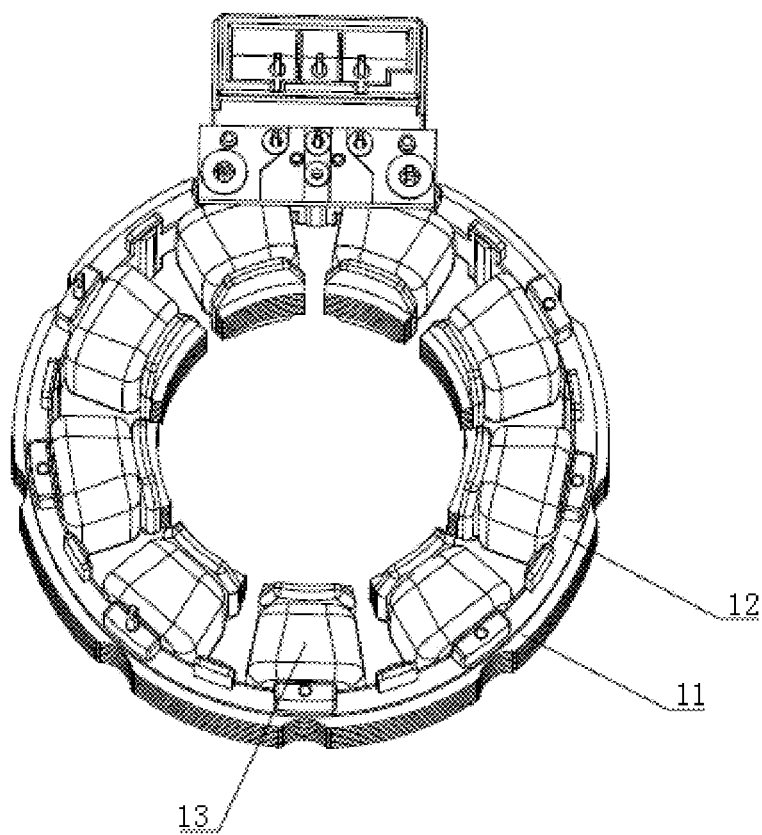
FIG. 2 is a solid schematic structural diagram of an iron core, a three-phase coil and a coil bobbin of the present invention.
Figure 3:
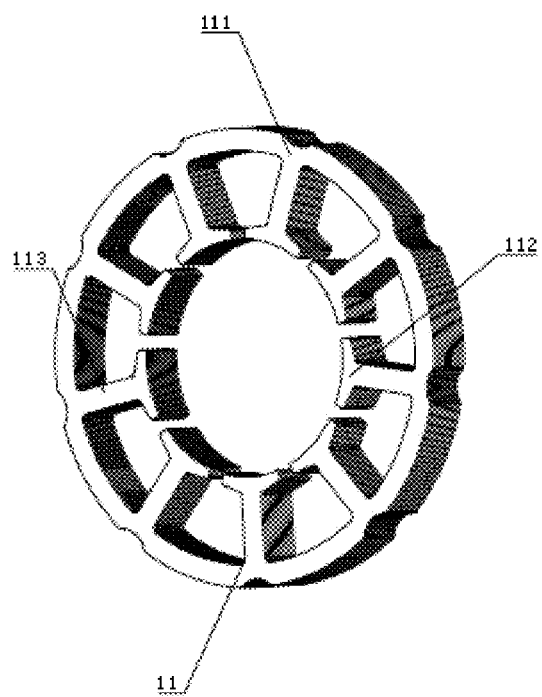
FIG. 3 is a solid schematic structural diagram of the iron core of the present invention.
Figure 4:
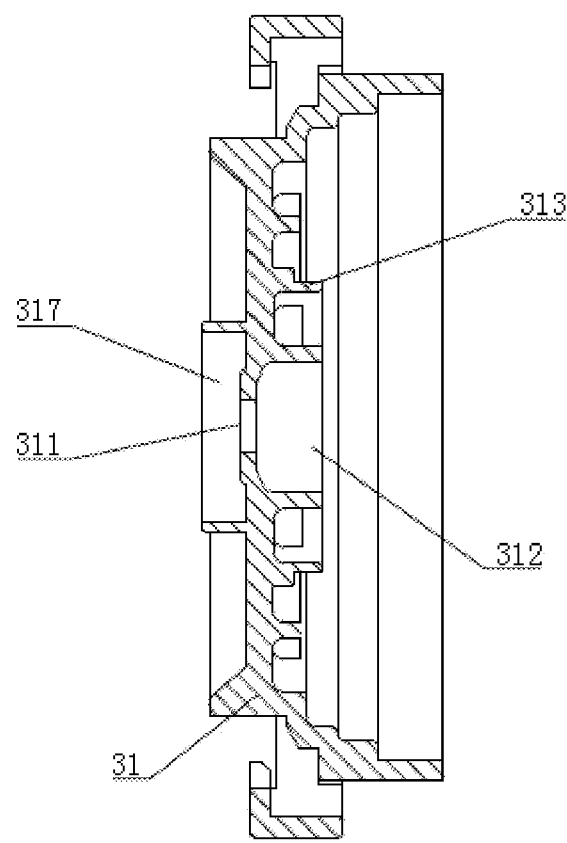
FIG. 4 is a planar schematic structural diagram of a cover body of the present invention.
Figure 5:
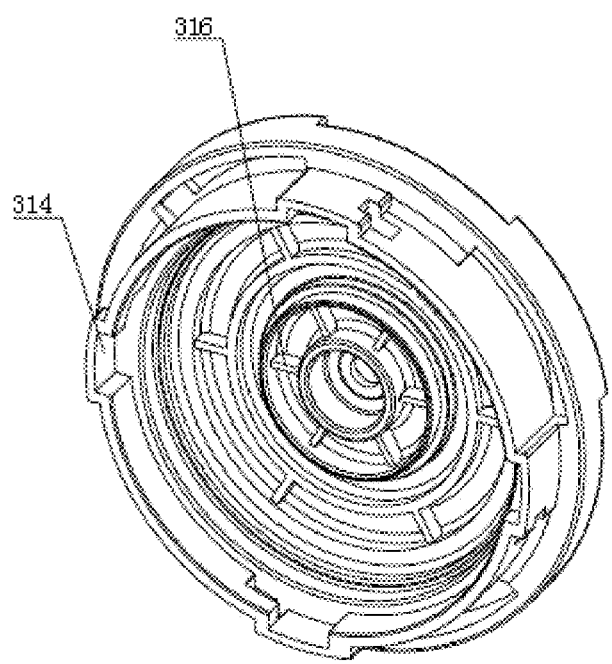
FIG. 5 is a solid schematic structural diagram of the cover body of the present invention.
Figure 6:
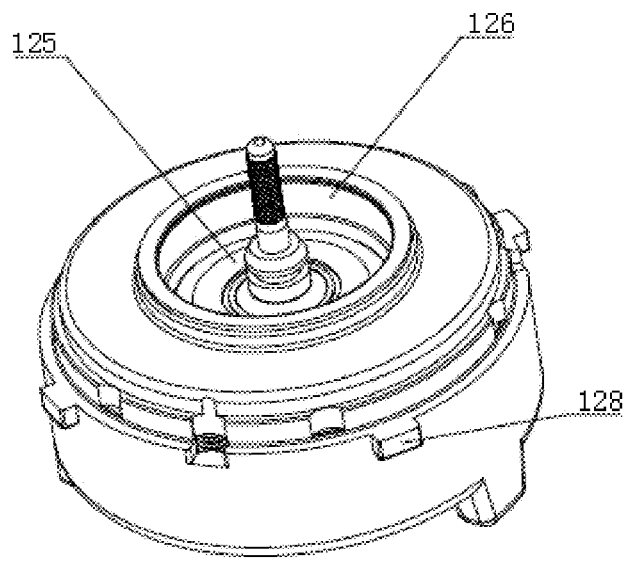
FIG. 6 is a solid schematic structural diagram of a stator of the present invention.
Figure 7:
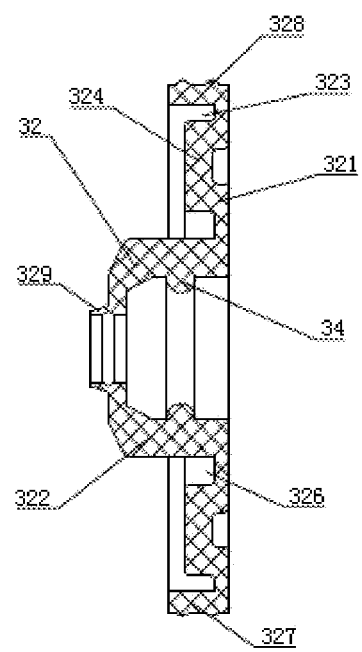
FIG. 7 is a planar schematic structural diagram of a seal ring of the present invention.
Figure 8:
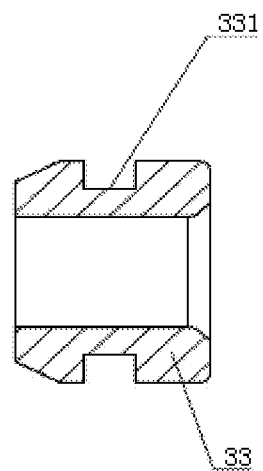
FIG. 8 is a schematic structural diagram of a bearing of the present invention.
Figure 9:
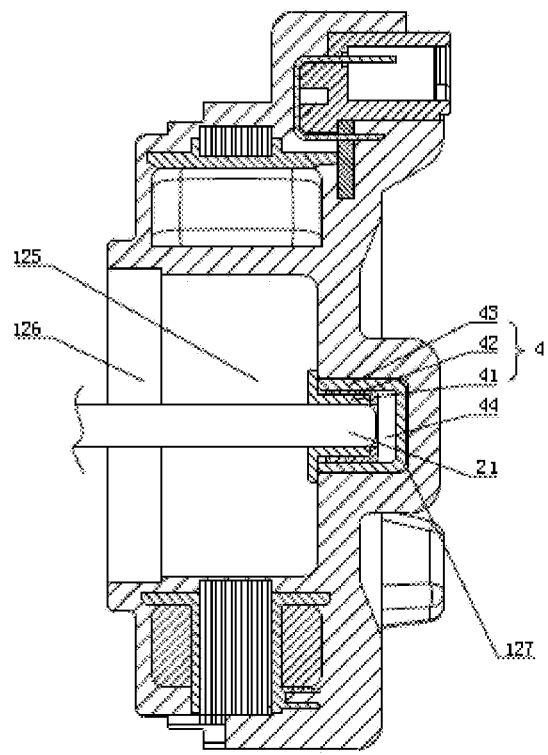
FIG. 9 is a planar schematic structural diagram of the stator of the present invention.
Figure 10:
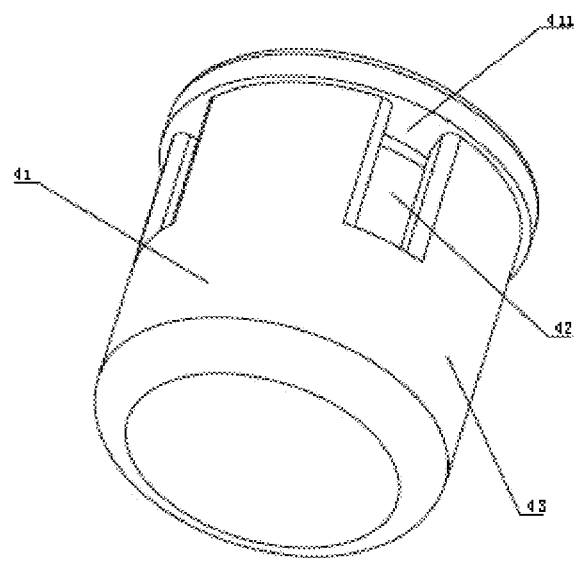
FIG. 10 is a solid schematic structural diagram of an end sleeve of the present invention.
Figure 11:
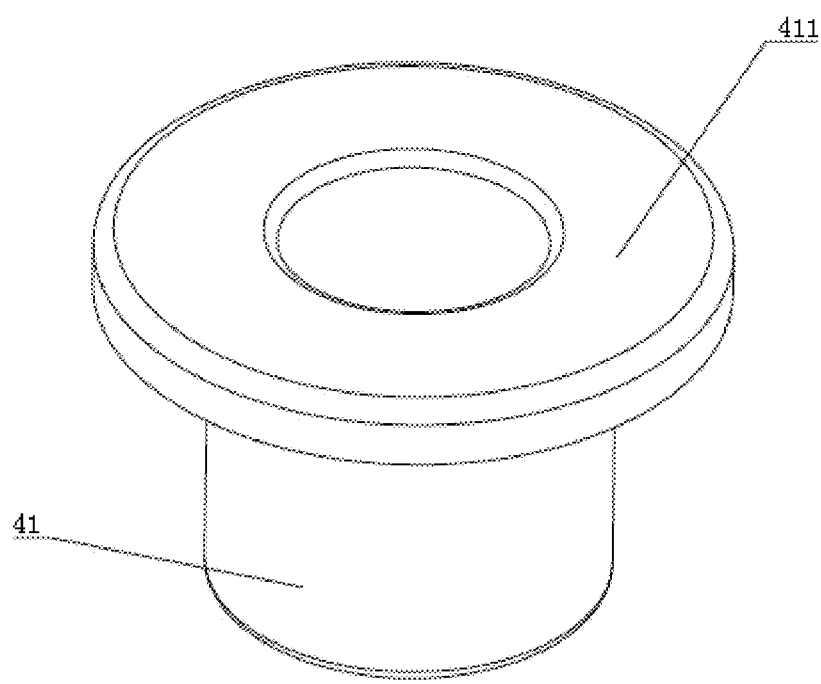
FIG. 11 is a solid schematic structural diagram of a support sleeve of the present invention.
Figure 12:
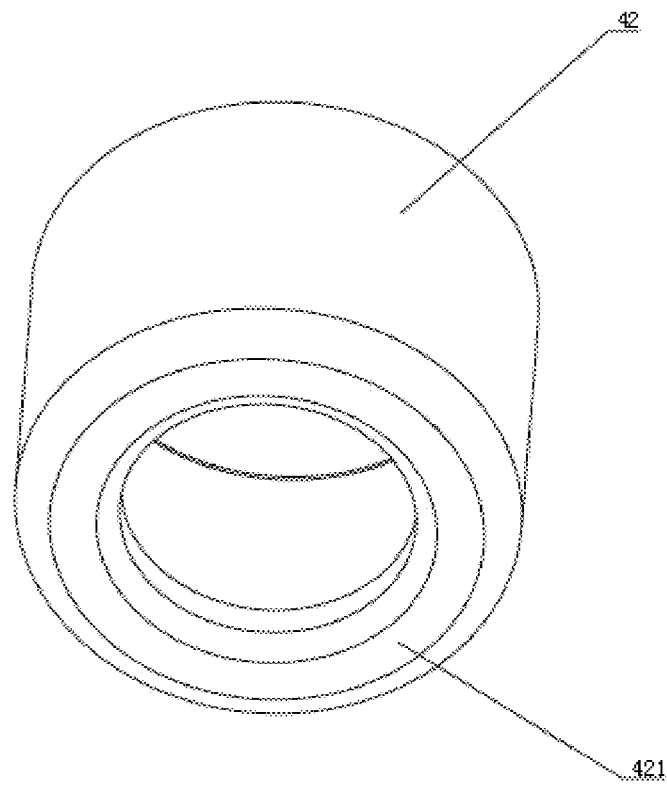
FIG. 12 is a solid schematic structural diagram of a rubber sleeve of the present invention.
Figure 13:
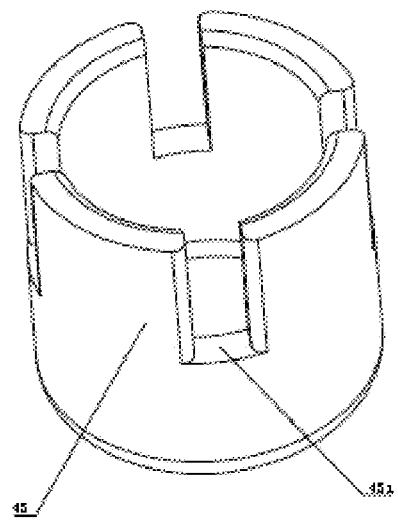
FIG. 13 is a solid schematic structural diagram of a casing of the present invention.

In order to make the objective, the technical solution and the advantages of the present invention more clear, the present invention is further described in detail below in conjunction with the particular embodiments and with reference to the accompanying drawings 1 to 13.

A specific solution of a three-phase drainage motor for a washing machine provided by the present invention is as follows:

the three-phase drainage motor for the washing machine includes a stator 1, a rotor 2 and an upper cover 3, wherein the rotor 2 is sealed inside the stator 1 through the upper cover 3. The stator 1 includes an iron core 11, a coil bobbin 12, a three-phase coil 13 and a plastic package portion 14, wherein the iron core 11 includes a hub 111, an inner ring 112 and teeth 113, the teeth 113 radially connecting the hub 111 to the inner ring 112, the inner ring 112 being of a nice-section arc structure, the coil bobbin 12 covers the teeth 113, the three-phase coil 13 is wound around the coil bobbin 12, the plastic package portion 14 is wrapped around the coil bobbin 12, the three-phase coil 13 and the iron core 11 to form a spigot 126, a rotor cavity 125 and a rotary shaft cavity 127, the spigot 126 is located above the rotary shaft cavity 127, and the rotary shaft cavity 127 is at a bottom of the rotor cavity 125. The plastic package portion 14 includes a housing 141, a wall surface of the rotor cavity 125 and a wall surface of the rotary shaft cavity 127, wherein the housing 141, the wall surface of the rotor cavity 125 and the wall surface of the rotary shaft cavity 127 are molded through integral injection. Therefore, the situation that water or moist air gets into the rotor cavity 125 to rust the inner ring 112, and a rust protrusion therefore generated rubs against an outer circle of the rotor 2 to generate noise is prevented, gaps between arc structures of the inner ring 112 are filled with the plastic package portion 14, and the plastic package portion 14 and the wall surface of the rotor cavity 125 are formed into an injection-molded whole, thereby enhancing the stability and the strength of the inner wall of the rotor cavity 125. The rotor 2 is provided with a three-pole-pair permanent magnet and mounted inside the rotor cavity 125, a rotary shaft of the rotor 2 is arranged in the upper cover 3 in a penetration mode, the upper cover 3 is detachably connected to the stator 1, and therefore the upper cover 3 is convenient to detach, which is conducive to replacement of the rotor 2 in the motor.

Further, a diameter of the rotor cavity 125 is less than that of the spigot 126, the rotor cavity 125 is configured to accommodate the rotor 2, the rotary shaft cavity 127 is configured to accommodate and support a rotor rear shaft 21, the spigot 126 is configured to support a front shaft assembly of the rotor 2, the plastic package portion 14 is made of a bulk molding compound (BMC), a wall thickness (t) of a part, between a side wall surface 1251 of the rotor cavity 125 and nine sections of arc surfaces of the inner ring 112 of the iron core 11, of the plastic package portion 14 is less than 0.6 mm. Under the condition that the stability and the strength of a wall thickness of a side wall of the rotor cavity 125 are guaranteed, and on the premise that the wall surface of the rotor cavity 125 does not rub against the outer circle of the rotor 2, the smaller t, the better, and it would be preferred to select t between 0.3 mm and 0.4 mm, thereby reducing a gap, which is an air gap of the motor, between the rotor 2 and the inner ring 112 to improve the motor efficiency and also preventing the noise generated friction between the rust protrusion generated by rust of the nine sections of arc surfaces and the outer circle of the rotor 2.

Further, the upper cover 3 includes a cover body 31 and a seal ring 32, wherein an axial center of the cover body 31 is provided with an axis hole 311, the cover body 31 protrudes towards a direction of the stator 1 to form a mounting cavity 312 and a positioning ring 313, wherein the mounting cavity 312, the positioning ring 313 and the axis hole 311 are coaxially arranged, a diameter of the positioning ring 313 is greater than that of the mounting cavity 312, and the positioning ring 313 is arranged on the periphery of the mounting cavity 312. The seal ring 32 is in close fit with the rotor cavity 125, and therefore, the sealing performance of the rotor cavity 125 is guaranteed. The seal ring 32 includes an annular base plate 321, wherein the annular base plate 321 axially protrudes to form a mounting portion 322, the mounting portion 322 is formed into a barrel body and arranged coaxial with the seal ring 32, the mounting portion 322 is arranged on the rotary shaft of the rotor 2 in a sleeving mode through a bearing 33, an inner wall of the mounting portion 322 is in close fit with the bearing 33, the mounting portion 322 is arranged in the mounting cavity 312 in a closely embedded mode, the annular base plate 321 is further provided with a positioning groove 323, the positioning ring 313 matches the positioning groove 323, the positioning groove 323 and the positioning ring 313 are clamped to each other to further enhance the sealing performance, so as to further effectively prevent the water from getting into a motor shaft.

Further, the cover body 31 protrudes in a direction away from the stator 1 to form a cavity 317, wherein the cavity 317 and the axis hole 311 are coaxially arranged. Therefore, the cavity 317 effectively prevents foreign matter from being wound around an impeller and a root of a motor output shaft.

Further, a lower portion of the cover body 31 is provided with a plurality of clamping grooves 314, the clamping grooves 314 are uniformly distributed on an an outer circumferential surface of the cover body 31 around an axis, an upper portion of the stator 1 is provided with a plurality of clamping blocks 128, and the clamping blocks 128 are slidably clamped into the clamping grooves 314. The cover body 31 is slidably clamped into the clamping grooves 314 through the clamping blocks 128, and is convenient to mount and dismount, so as to be conducive to the replacement of the rotor 2.

Further, a plurality of reinforcing ribs 316 are uniformly arranged between the mounting cavity 312 and the positioning ring 313, the reinforcing ribs 316 are radially arranged along the upper cover 3, the annular base plate 321 is further provided with a platform 324, a groove 326 is formed between the platform 324 and the mounting portion 322, an edge of the mounting cavity 312 is clamped into the groove 326, and the platform 324 matches the reinforcing ribs 316. In this way, the reinforcing ribs 316 are arranged to enhance the strength on the periphery of the axis hole 311 on one hand, and match the seal ring 32 to further enhance the sealing performance on the other hand.

A periphery of the annular base plate 321 is further provided with a retaining ring 327, wherein the positioning groove 323 is formed between the retaining ring 327 and the platform 324, the positioning ring 313 is of a step structure, the positioning ring 313 is in hermetic fit with the positioning groove 323 and the retaining ring 327, an outer wall of the retaining ring 327 protrudes to form two seal outer rings 328, and the seal outer rings 328 are arranged spaced from each other. In this way, the positioning ring 313 is in close fit with the positioning groove 323 to further enhance the closeness between the seal ring 32 and the cover body 31, and the seal outer rings 328 enhance the closeness between the seal ring 32 and the rotor cavity 125 to prevent a water flow permeated into a joint between the cover body 31 and an outer circle of the stator 1 from getting into a cavity of the stator 1, thereby improving the waterproofness of the whole motor.

Further, an outer wall of the bearing 33 is dented to form a seal groove 331, the inner wall of the mounting portion 322 is provided with a seal inner ring 34 in seal fit with the seal groove 331, a cross section of the seal groove 331 is rectangular, and a cross section of the seal inner ring 34 is semicircular. In this way, the mounting portion 322 is arranged on the bearing 33 in a sleeving mode, which is realized in a mode that the seal inner ring 34 is clamped into the seal groove 331, and the mounting portion 322 is in seal fit with the bearing 33. An end portion of the mounting portion 322 protrudes to form an annular seal lip 329, and the annular seal lip 329 is in close fit with a hole wall of the axis hole 311. In this way, the rotary shaft of the rotor 2 penetrates the axis hole 311 to guarantee the hermeticity at the axis hole 311 through the annular seal lip 329.

Further, the rotary shaft cavity 127 is provided with an end sleeve 4 in a closely embedded mode, such that the end sleeve 4 will not be driven to rotate, in the rotary shaft cavity 127, by the rotary shaft of the rotor 2. An oil storage cavity 44 is formed in the end sleeve 4, and the oil storage cavity 44 is configured to store lubricating oil. The rotor rear shaft 21 extends into the oil storage cavity 44 and is movably arranged inside the oil storage cavity, an inner hole of the end sleeve 4 is arranged in contact with an external diameter of the rotor rear shaft 21, that is, a side surface of an inner wall of the oil storage cavity 44 is arranged in contact with a side surface of an outer wall of the rotor rear shaft 21, and is arranged in contact with a side surface of an inner wall of the end sleeve 4 to guarantee the stability during rotation of the rotary shaft of the rotor 2 to avoid the rotation deviation. An end surface of the rotor rear shaft 21 and a bottom surface of the oil storage cavity 44 are arranged in a spaced mode to reduce the probability of wear, by the rotor rear shaft 21, to a bottom of the end sleeve 4. The end sleeve 4 is arranged between the rotary shaft of the rotor 2 and the rotary shaft cavity 127, thereby intercepting the wear, by the rotor 2, to a side wall of the rotary shaft cavity 127, so as to form a lubricating oil storage space, to effectively prevent the possibility that the lubricating oil leaks out of the rotary shaft cavity 127 and to greatly reduce the probability of oil leakage of the motor.

Further, the end sleeve 4 includes a support sleeve 41, a rubber sleeve 42 and a casing 43, wherein the rubber sleeve 42 is arranged on the support sleeve 41 in a close sleeving mode, the casing 43 is arranged on the rubber sleeve 42 in a close sleeving mode, the casing 43 is arranged inside the rotary shaft cavity 127, the rubber sleeve 42 is arranged between the support sleeve 41 and the casing 43, and thus the friction force between the support sleeve 41 and the casing 43 is increased to prevent the end sleeve 4 from being driven by the rotary shaft, and meanwhile, the sealing performance is increased to prevent the lubricating oil from flowing into the rotary shaft cavity 127.

An upper end of the support sleeve 41 is provided with an annular support table 41, wherein a diameter of the annular support table 41 is greater than that of the rotary shaft cavity 127, and the annular support table 41 is arranged above the rotary shaft cavity 127 and closely attached to a bottom surface of the rotor cavity 125. In this way, the annular support table 41 supports the rotor 2 to realize that the rotor 2 and the bottom surface of the rotor cavity 125 are arranged in a spaced mode, thereby avoiding the wear, by the rotation of the rotor 2, to the bottom surface of the rotor cavity 125 and further preventing the lubricating oil from flowing into the rotary shaft cavity 127. A bottom end of the rubber sleeve 42 radially extends to form a fixing ring 42, wherein an inner diameter of the fixing ring 42 is less than that of the support sleeve 41, the fixing ring 42 makes contact with a bottom of the support sleeve 41, and through the self-friction force, it is guaranteed that the rubber sleeve 42 does not shift. An end opening of the casing 43 is uniformly provided with a plurality of notches 43, wherein depths of the notches 43 are less than a height of the rubber sleeve 42. In this way, mounting and dismounting of the support sleeve 41 and the rubber sleeve 42 are facilitated.

The plastic package portion 14 of the three-phase drainage motor for the washing machine provided by the present invention is configured to prevent the situation that the water or moist air gets into the rotor cavity 125 to rust the arc surfaces of the inner ring 112, and the rust protrusion therefore generated rubs against the outer circle of the rotor 2 to make noise. The plastic package portion 14 filling the gaps between the nine sections of arc surfaces of the inner ring 112 of the iron core 11 of the stator 1, and the wall surface of the rotor cavity 125 are formed into one injection whole, such that the stability and the strength of the inner wall of the rotor cavity 125 are enhanced. The seal ring 32 guarantees the sealing performance at the axis hole 311 of the upper cover 3, and also guarantees the hermeticity of the rotor cavity 125 to further effectively prevent the water from getting into the motor shaft; and the seal ring 32 matches the rotor cavity 125 to prevent the water flow permeated into the joint between the cover body 31 and the outer circle of the stator 1 from getting into the cavity of the stator 1, thereby improving the waterproofness of the entire motor. In addition, the end sleeve 4 is arranged between the rotary shaft of the rotor 2 and the rotary shaft cavity 127, thereby intercepting the wear, by the rotor 2, to the side wall of the rotary shaft cavity 127, so as to form the lubricating oil storage space, to effectively prevent the possibility that the lubricating oil leaks out of the rotary shaft cavity 127 and to greatly reduce the probability of the oil leakage of the motor. Therefore, through the arrangement of the plastic package portion 14, the seal ring 32 and the end sleeve 4, the three-phase drainage motor for the washing machine provided by the present invention avoids generating noise in the motor so as to prolong the service life of the motor.

What mentioned above is only the preferred practicable embodiments of the present invention and is not used to limit the present invention, the present invention is not limited to the above-mentioned examples either, and changes, modifications, addition or substitutions made by those skilled in the art within the essential scope of the present invention should also fall within the scope of protection of the present invention.

What is claimed is:

1. A three-phase drainage motor for a washing machine, comprising a stator, a rotor and an upper cover, wherein the rotor is sealed inside the stator through the upper cover;

the stator comprises an iron core, a coil bobbin, a three-phase coil and a plastic package portion, wherein the iron core comprises a hub, an inner ring and teeth, the teeth radially connecting the hub to the inner ring, the inner ring being of a nine-section arc structure, the coil bobbin covers the teeth, the three-phase coil is wound around the coil bobbin, the plastic package portion is wrapped around the coil bobbin, the three-phase coil and the iron core to form a spigot, a rotor cavity and a rotary shaft cavity, the spigot is located above the rotor cavity, the rotary shaft cavity is at a bottom of the rotor cavity, the plastic package portion comprises a housing, a wall surface of the rotor cavity and a wall surface of the rotary shaft cavity, and the housing, the wall surface of the rotor cavity and the wall surface of the rotary shaft cavity are molded through integral injection; and the rotor is mounted inside the rotor cavity, wherein a rotary shaft of the rotor is arranged in the upper cover in a penetration mode, and the upper cover is detachably connected to the stator, wherein the upper cover comprises a cover body and a seal ring; an axial center of the cover body is provided with an axis hole, the cover body protrudes towards a stator direction to form a mounting cavity and a positioning ring, the mounting cavity, the positioning ring and the axis hole are coaxially arranged, a diameter of the positioning ring is greater than that of the mounting cavity, and the seal ring is in close fit with the rotor cavity; and the seal ring comprises an annular base plate, wherein the annular base plate axially protrudes to form a mounting portion, the mounting portion is formed into a barrel body and arranged coaxial with the seal ring, the mounting portion is arranged on the rotary shaft of the rotor in a sleeving mode through a bearing, an inner wall of the mounting portion is in close fit with the bearing, the mounting portion is closely arranged in the mounting cavity in an embedded mode, the annular base plate is further provided with a positioning groove, and the positioning ring matches the positioning groove.

2. The three-phase drainage motor for the washing machine according to claim 1, wherein a diameter of the rotor cavity is less than that of the spigot, the plastic package portion is made of a bulk molding compound (BMC), a wall thickness of a part, between a side wall surface of the rotor cavity and nine sections of arc surfaces of the inner ring of the iron core, of the plastic package portion is less than 0.6 mm.

3. The three-phase drainage motor for the washing machine according to claim 1, wherein a lower portion of the cover body is provided with a plurality of clamping grooves, the clamping grooves are uniformly distributed on an outer circumferential surface of the cover body around an axis, an upper portion of the stator is provided with a plurality of clamping blocks, and the clamping blocks are slidably clamped into the clamping grooves.

4. The three-phase drainage motor for the washing machine according to claim 1, wherein the cover body protrudes in a direction away from the stator to form a cavity, and the cavity and the axis hole are coaxially arranged.

5. The three-phase drainage motor for the washing machine according to claim 1, wherein a plurality of reinforcing ribs are uniformly arranged between the mounting cavity and the positioning ring, and the reinforcing ribs are radially arranged along the upper cover;

the annular base plate is further provided with a platform, wherein a groove is formed between the platform and the mounting portion, an edge of the mounting cavity is clamped into the groove, and the platform matches the reinforcing ribs; and a periphery of the annular base plate is further provided with a retaining ring, wherein the positioning groove is formed between the retaining ring and the platform, the positioning ring is of a step structure, the positioning ring is in hermetic fit with the positioning groove and the retaining ring, an outer wall of the retaining ring protrudes to form two seal outer rings, and the seal outer rings are arranged spaced from each other.

6. The three-phase drainage motor for the washing machine according to claim 1, wherein an outer wall of the bearing is dented to form a seal groove, an inner wall of the mounting portion is provided with a seal inner ring in seal fit with the seal groove, a cross section of the seal groove is rectangular, a cross section of the seal inner ring is semicircular, an end portion of the mounting portion protrudes to form an annular seal lip, and the annular seal lip is in close fit with a hole wall of the axis hole.

7. The three-phase drainage motor for the washing machine according to claim 1, wherein the rotary shaft cavity is provided with an end sleeve in a closely embedded mode, an oil storage cavity is formed in the end sleeve, a rotor rear shaft extends into the oil storage cavity and is movably arranged inside the oil storage cavity, an inner hole of the end sleeve is arranged in contact with an external diameter of the rotor rear shaft, and an end surface of the rotor rear shaft and a bottom surface of the oil storage cavity are arranged in a spaced mode.

8. The three-phase drainage motor for the washing machine according to claim 7, wherein the end sleeve comprises a support sleeve, a rubber sleeve and a casing, the rubber sleeve being arranged on the support sleeve in a close sleeving mode, the casing being arranged on the rubber sleeve in a close sleeving mode, and the casing being arranged inside the rotary shaft cavity;

an upper end of the support sleeve is provided with an annular support table, wherein a diameter of the annular support table is greater than that of the rotary shaft cavity, and the annular support table is arranged above the rotor cavity and closely attached to a bottom surface of the rotor cavity; a bottom end of the rubber sleeve radially extends to form a fixing ring, wherein an inner diameter of the fixing ring is less than that of the support sleeve; and an end opening of the casing is uniformly provided with a plurality of notches, wherein depths of the notches are less than a height of the rubber sleeve.

* * * * *